March 7, 1950   R. L. WILSON   2,499,805
CONTROL APPARATUS
Filed April 22, 1946   2 Sheets-Sheet 1

Fig. 1

INVENTOR.
ROSSER L. WILSON
BY Wallace and Cannon
Attorneys

March 7, 1950  R. L. WILSON  2,499,805
CONTROL APPARATUS

Filed April 22, 1946  2 Sheets-Sheet 2

INVENTOR.
ROSSER L. WILSON
BY *Wallace and Cannon*
*Attorneys*

Patented Mar. 7, 1950

2,499,805

UNITED STATES PATENT OFFICE 2,499,805

CONTROL APPARATUS

Rosser L. Wilson, Mahwah, N. J., assignor to American Brake Shoe Company, New York, N. Y., a corporation of Delaware Application April 22, 1946, Serial No. 663,908

10 Claims. (Cl. 175—320)

This invention relates to control apparatus for use in governing the relative speeds of moving parts of machinery such as shafts and the like, and particularly it relates to such control apparatus for establishing and maintaining a substantially synchronous or other desired speed relationship between two or more such moving parts such as two or more rotating shafts which otherwise would operate independently of each other.

The need for control apparatus of the aforesaid character may arise in any situation where it is desirable that the variantly adjustable operating speed of a particular member, such as a shaft, serves as a standard with which the operating speed of one or more other independently driven shafts or the like is to be correlated. In such instances the shaft which is to constitute the standard may serve merely as a variable speed control shaft for one or more engines, motors or the like, or it may constitute the shaft of a master engine or motor of a group of two or more similar engines or motors which are to be operated in a correlated relationship.

The use of one or more engines as the driving power for an airplane affords one typical situation where control apparatus of the aforesaid character is desirable, for whether the airplane be driven by a single engine, or by two or more similar engines, the maintenance of the desired speed of operation in such engine or engines is extremely difficult because of the rapid and extremely wide variance of the factors such as wind resistance, attitude of flight or the like, which affect and vary the operating speed of such engine or engines. Thus, in a single engine airplane, a variable speed electric motor may be used as a standard from which the speed of operation of the single engine may be automatically governed by control apparatus of the aforesaid character; while in an airplane having a plurality of engines, such control apparatus may serve to coordinate the speed of all of the engines with the speed of such a variable speed electric motor, or if desired, a particular one of the engines may serve as the variable standard of speed, and such control apparatus may serve to coordinate the speed of the other engines with the one engine which in such an event constitutes the standard or master engine. It is therefore an object of this invention to enable automatic yet adjustable control of the speed of one or more engines to be attained more rapidly than heretofore, and in such a manner that control of the speed thereof is simplified and rendered more accurate, and if desired the control of the speed of all of the engines of a multi-motored airplane may be adjusted through manipulation of but a single control means.

Where such control apparatus is used as aforesaid to control the operating speed of one or more airplane engines, it is of course desirable that the apparatus be rugged in character, relatively light in weight, and dependable and accurate in its operation or correlation of the secondary shafts or engines with the master shaft, and in the patent to Wilson No. 2,232,753, patented February 25, 1941, and in the copending application of Wilson and Knauer, Serial No. 624,184, filed October 24, 1945, now issued as Patent No. 2,460,055, patented January 25, 1949, several forms of control apparatus are disclosed which meet these fundamental requirements. It is, however, an important object of this invention to enable further improvement of the operating characteristics of such control apparatus to be attained, and to enable the desired accuracy of speed correlation or control to be attained extremely rapidly under the many varying circumstances which may involve variations in the nature of the equipment to be controlled as well as varying conditions of use.

Control apparatus of the aforesaid character attains the desired speed correlation through the control of power operated speed adjusting mechanism which, upon detection of undesired speed variance, acts to adjust the speed of the secondary shaft or the like in such a sense as to tend to reestablish the desired speed relationship. As a practical matter, the power operated speed adjusting means may be arranged to attain the speed adjustment in different ways which are determined to a great extent by the field in which the apparatus is used. For example, in an airplane engine, the speed may be varied by adjustment of the pitch of the propeller driven thereby, or by adjustment of the fuel supply means such as a carburetor, or by adjustment of other means which affect engine speed. Where resort is had to the adjustment of the propeller pitch, the power means for operating the same may in many instances constitute a standardized part of the equipment to which the control apparatus as a whole must be related and adapted so as to attain the desired accuracy of speed correlation.

In the operation of control apparatus of the kind to which this invention relates, the detection of an undesired speed variance by the detecting means of the apparatus causes a control impulse to be transmitted to the speed adjusting means of the shaft which is being controlled thereby, and the characteristics of such control impulses, such as the length and frequency thereof, have a controlling influence upon the operation of the speed adjusting means and its effectiveness in re-establishing the desired speed relationship. Thus, when different speed adjusting means are encountered, the characteristics of the control impulses transmitted thereto by the control apparatus must be suited to the characteristics of the particular speed adjusting means in order that such speed adjusting means may accomplish the desired speed correlation, and to enable this to be readily accomplished is an important object of this invention. Objects related to the foregoing are to simplify the interrelationship or matching of the detecting means and the speed adjusting means in control apparatus of the foregoing character, and to enable this to be done so as to assure rapid correction of the detected speed difference while assuring against over-correction.

In the control apparatus disclosed in the aforesaid patent and copending application, the detection of the undesired speed differential between a master shaft and one or more secondary shafts is accomplished through commutator switch devices associated with the respective shafts so as compare the speeds of the master and secondary shafts and transmit energizing impulses in succession along different electrical paths to associated relay switch mechanism, and this relay switch mechanism, in accordance with the order or sequence in which such impulses are received from such electrical paths and in accordance with the time spacing of such impulses, is operable to determine whether the speed differential between the compared shafts exceeds the allowable tolerance and in which sense a corrective adjustment must be applied to the secondary shaft to re-establish the desired speed relationship; and upon such determination one or more control impulses are transmitted in succession to the speed adjusting means to cause corresponding periods of corrective speed adjustment in the required direction or sense. The relay switch mechanism of the aforesaid patent is such that it includes a first or master relay which is of the slow-to-release type, and when a speed differential between the two compared shafts causes this relay to be momentarily energized, the contacts of this master relay remain closed for a predetermined delay period determined by the release time of the relay. Two secondary relays are also included in the aforesaid relay switch mechanism, and depending on the sense of the existing speed variance or differential, a circuit to one of these secondary relays may next be closed through the commutator switches. If such circuit closure takes place during the delay period of the slow-to-release or master relay, the corresponding secondary relay will be actuated, and during the balance of the release period of the master relay a control circuit will be completed to the speed adjusting means to cause operation thereof in the proper sense or direction.

The maintenance of the speed relationship of a master shaft and a secondary shaft within a predetermined tolerance by control apparatus of the character to which this invention relates is of course dependent upon the ability of the detecting means of such apparatus to detect relatively small variations in the speed relationship of such shafts, to thereby enable correction to be made before the speed differential becomes objectionably large, and in the control apparatus of the aforesaid patent, the sensitivity of the apparatus to small speed differences may be increased by increasing the release time of the master relay of the switch mechanism. Under many conditions resort may be had to such increase or other adjustment of the release time of the master or slow-to-release relay to attain the desired sensitivity of the apparatus, but in the application of the control apparatus to different types of mechanism, conditions may arise where the extended period of closure which is necessary for the master relay in order to attain added sensitivity will so extend the period of corrective adjustment as to cause over-correction which cannot be detected until after the master relay has released. In the aforesaid copending application, means are disclosed which enable the normal release time of the master relay in control apparatus of the foregoing character to be materially extended without destroying or objectionably limiting the ability of the apparatus to detect reversal of the sense of relative rotation of the two shafts. Thus, the apparatus disclosed in the aforesaid copending application enables the normal release time of the master relay of such control apparatus to be relatively long so as to impart extreme initial sensitivity to the apparatus, and yet enables such release time to be reduced as an incident to the detection of a speed difference which requires correction, thereby to minimize over-correction and render the apparatus more quickly sensitive to reversal of the sense of relative rotation of the two shafts.

While control apparatus of the kind to which this invention relates operates under normal service conditions to maintain the speeds of the compared members or shafts within the operating tolerance for which the apparatus is designed, it must be recognized that circumstances may arise where the speed difference is relatively great, and to enable such apparatus to quickly establish or re-establish the desired speed relation under such conditions without danger of over-correction is a further object of this invention. When such a great speed differential is present it is usually quite important that the desired speed relationship be re-established as rapidly as possible, and to enable this to be accomplished in control apparatus which operates within a small tolerance is another important object of the invention, and a further and related object of the invention is to render the rate of correction of the speed of the master shaft dependent upon the magnitude of the existing speed differential.

Other and more specific objects of the invention are to enable sensitivity of detection to be retained in an apparatus of the aforesaid character while at the same time enabling the length of the adjusting periods to be accurately controlled so as to assure prompt and rapid readjustment while preventing over-correction. Other objects are to minimize the number of adjusting periods required to re-establish the desired speed relationship and to accomplish this in such a way that hunting will be avoided.

Other and further objects of the present invention will be apparent from the following description and claims and are illustrated in the accompanying drawings which, by way of illustration, show preferred embodiments and the principle thereof and what is now considered to be the best mode of applying that principle. Other embodiments of the invention embodying the same or equivalent principle may be used and structural changes may be made as desired by those skilled in the art without departing from the present invention and purview of the appended claims.

In the various embodiments of the invention chosen for disclosure herein the invention is particularly adapted for governing the speed of one or more engines of an airplane, but it will be recognized that these embodiments of the invention are of general utility, and may be effectively employed in any circumstance where correlation of the speeds of two or more rotating and independently driven shafts is desired. Thus in the embodiment of the invention illustrated in Fig. 1 of the drawings, a pair of shafts 20M and 20—1 are shown, and means are provided for correlating the speeds of these shafts so that one of the shafts, as the shaft 20M, constitutes the master shaft, and the other shaft 20—1 is maintained at a speed which bears a predetermined relationship to the master shaft 20M. This predetermined relationship may, as in the present case, be a substantially synchronous relationship, or, by the use of means such as gearing, any other desired speed relationship between two or more shafts or the like may be maintained.

Figure 1:
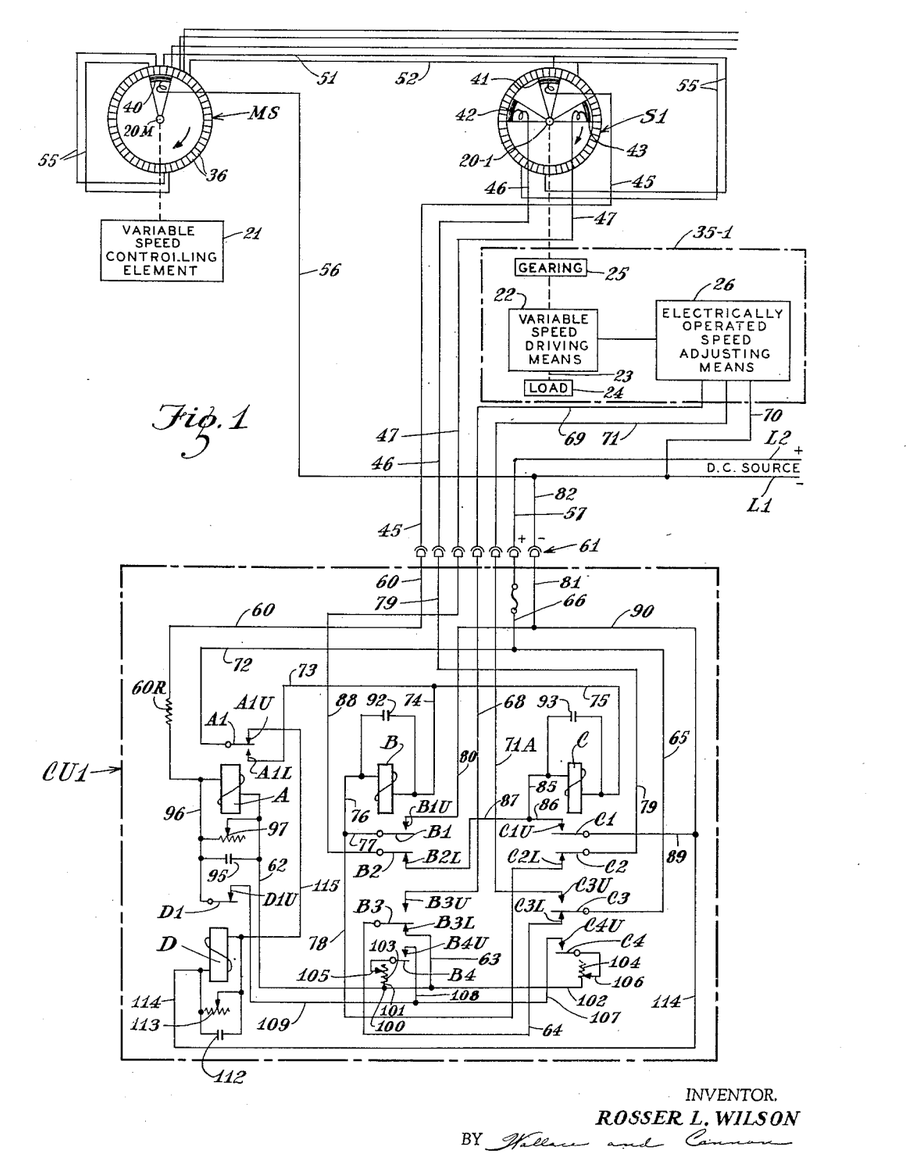
Fig. 1 is a schematic wiring diagram illustrating a control apparatus embodying the features of the invention and adapted for correlating the speed of one or more secondary shafts with the speed of a master shaft.

In the attainment of the desired speed relationship between the shafts, the master shaft 20M is driven at the desired speed by driving means such as a variable speed controlling element 21 which may take any desired form such as a variable speed electric motor or a variable speed engine. Thus, as illustrated in Fig. 1 of the drawings, it is contemplated that the master shaft 20M will serve merely as a standard or master shaft with which the speed of the other or secondary shaft 20—1 is to be correlated, and hence the variable speed controlling element 21 may be in the form of a relatively small variable speed electric motor. The secondary shaft 20—1 may be driven by an individual variable speed driving internal combustion engine such as the engine indicated at 22 in Fig. 1, which may take the form of an airplane engine operating through its main shaft 23 to drive a load 24 such as an airplane propeller. The drive from the engine shaft 23 to the related shaft 20—1 may, of course, be direct, or as in the present instance, may be attained through gearing 25. The speed of each such engine, and hence of the associated shaft as 20—1, may be varied by adjustment of the load or the propeller pitch, or by adjustment of the fuel supply means, and this may be accomplished by operation of conventional speed governing means such as the mechanism of a variable pitch propeller, or by operation or adjustment of the fuel pump or carburetor of the engine. Thus in Fig. 1 of the drawings such governing mechanism is of such a character as to be electrically operable and is indicated generally as 26, and it is by automatic operation or adjustment of such governing mechanism 26 that the desired correlation of the secondary shaft 20—1 with the master shaft 20M is attained under the present invention. The governing mechanism 26 is, of course, adjustable in two directions so as to enable the speed of the secondary shaft 20—1 to be increased or decreased in accordance with the sense of the variance between the speeds of this shaft and the master shaft 20M, and such actuation may be effected in different ways, as, for example, by a reversible electric motor forming part of the adjusting means 26.

The mechanism which has thus been described for driving the secondary shaft 20—1, and for adjusting the speed at which the shaft 20—1 is driven, may be said to constitute a driving and speed adjusting unit 35—1 for the secondary shaft 20—1, the elements which make up such unit being clearly indicated in Fig. 1 by being included within a block defined by dot-dash lines and indicated by the reference character 35—1; and similar driving and speed adjusting units may be similarly associated with additional secondary shafts in the manner disclosed in the aforesaid copending application.

Under the present invention the speed of the secondary shaft 20—1 is compared with the speed of the master shaft 20M to detect the presence and sense of any undesired variable between the speeds of the secondary shaft and the master shaft, and upon such detection of undesired speed variance, the speed governing means of the associated engine 22 is adjusted in a controlled manner in the direction required to re-establish the desired speed relationship. In accomplishing such adjustment an individual control unit CU1 is provided which governs the operation of the speed adjusting means 26 of the unit 35—1, and such control unit CU1 is, in turn, associated with detecting means whereby the speed of the secondary shaft 20—1 is compared with the speed of the master shaft 20M, and such detecting means include a plurality of commutator switches MS and S1 associated respectively with the shafts 20M and 20—1. Each such commutator switch includes a circularly arranged series of commutator bars 36 and one or more brushes adapted for cooperation with such commutator bars 36. As shown in Fig. 1 the commutator bars 36 constitute the stationary parts of the switches, while the rotating parts of the switches are afforded by the brushes thereof, and hence the brushes of the respective commutator switches are arranged to be driven by the shafts with which their commutator switches are associated. Thus the master commutator MS has a single brush 40 driven by the shaft 20M, while the commutator switch S1 has three angularly spaced brushes 41, 42 and 43 driven as a unit from the secondary shaft 20—1.

The three brushes 41, 42 and 43 of each secondary commutator switch, as S1, are associated with the related control unit, as CU1, by means including wires 45, 46 and 47 which are extended respectively from the brushes 41, 42 and 43 through conventional slip ring connections, and selected commutator segments of the secondary switch are so connected with selected segments of the master commutator MS that when the speed of a secondary shaft varies so as to cause relative rotation to exist between that shaft and the master shaft 20M, circuits will be established to the wires 45, 46 and 47 in a sequence which depends upon the sense of such relative rotation and at a frequency dependent upon the magnitude of such relative rotation. In attaining this result, every fourth one of the commutator bars 36 of the master commutator MS is utilized for association with the commutator switch S—1 and is electrically connected to a correspondingly positioned commutator bar of the secondary commutator switch. This enables the master commutator switch to be associated with four secondary commutator switches in the manner disclosed in the aforesaid copending application. Thus, the upper bar 36 just to the right of the vertical center line of the master commutator MS is connected by a wire 51 to the correspondingly positioned commutator bar of the commutator switch S1, and the fifth bar 36 of the master commutator MS, in a clockwise direction, is connected by a wire 52 to the correspondingly positioned bar of the commutator switch S1; and similar connections are afforded for the other corresponding commutator bars of the switches MS and S1. In the present instance the commutator bars in each commutator are so arranged that each bar 36 is electrically connected to the diametrically opposite commutator bar, as by wires 55. The other connections between the master commutator and the secondary commutator are made in the manner described so that, within 180° of the circumference of each secondary commutator, six equally spaced commutator segments are connected to correspondingly positioned bars of the master commutator.

Where diametrically opposite commutator bars are electrically interconnected as in the embodiment shown in Fig. 1, the brushes 41, 42 and 43 of the secondary commutator switch S1 are arranged so as to lie entirely within 180° of the circumference of the commutator, and each of these brushes, as well as the brush 40 of the master commutator, has an angular or circumferential extent which is just equal to or is less than the combined angular extent of four commutator bars. This assures completion of the circuits to the wires 45, 46 and 47 in the desired manner, and avoids false indications of relative rotation or sense of such relative rotation.

To provide for such completion of electrical circuits through the respective brushes 41, 42 and 43 and the master brush 40, the master brush 40 is connected by a wire 56 to one line wire L1 of a direct current source, and the wires 45, 46 and 47 from the secondary commutator switch S1 are extended to the related control unit CU1 which is in turn associated with the other line wire L2 of the source by a wire 57 so that closure of circuits by the commutators will serve to energize elements of the relay unit as will hereinafter be explained.

Thus, the relay unit CU1 has a master relay A that is of the slow-to-release type, as will hereinafter be described, and a pair of secondary relays B and C that are operable in cooperation with the relay A in the general manner described in my aforesaid patent and in the aforesaid copending application to respond to the sequence of electrical impulses transmitted through the wires 45, 46 and 47 by the commutators MS and S1 to determine the sense or direction of relative rotation of the shafts 20M and 20—1, and which also respond to the frequency or time spacing of such impulses to detect and institute correction of speed difference in excess of a predetermined amount or tolerance. In affording the energizing circuit for the main relay A a wire 60, including a resistance 60R, is extended from the wire 45 through one element of a separable connector 61 and is connected to one terminal of the relay A, and the other terminal has a wire 62 extended therefrom so as to be connected to the line wire L2 through contacts of the relays B and C as will hereinafter become apparent.

The relay A has a movable contact A1 that is normally engaged with an upper stationary contact A1U, and when the relay A is operated the contact A1 is separated from the contact A1U and is engaged with a lower stationary contact A1L.

The relay B has four movable contacts B1, B2, B3 and B4, the contact B1 being normally open and being arranged to engage a stationary contact B1U when the relay B is operated. The contact B2 is normally engaged with a stationary contact B2L and is disengaged therefrom when the relay B is operated. The contact B3 is disposed between upper and lower stationary contacts B3U and B3L, and is arranged normally to engage the contact B3L and to be moved out of such contact and into engagement with the contact B3U when the relay B is operated. The contact B4 is disposed beneath and normally out of engagement with a stationary contact B4U, and is moved into engagement therewith upon operation of the relay B.

The relay C has movable contacts C1, C2, C3 and C4 that correspond with the contacts of relay B. Thus the contacts C1 and C4 are arranged so as to be in normally spaced relation to stationary contacts C1U and C4U respectively, and when the relay C is operated, the contacts C1 and C4 are engaged with the respective contacts C1U and C4U. The contact C2 is normally engaged with a stationary contact C2L, and is separated therefrom upon operation of the relay C. The contact C3 is disposed between upper and lower contacts C3U and C3L, and is normally engaged with contact C3L so as to be separated therefrom and engaged wth contact C3U upon operation of the relay C.

The operating circuit for the relay A is extended from the wire 62 by a wire 63 to the contact B3L, and a wire 64 connects the contact B3 to the contact C3L, so that wires 65 and 66 extended in series from the contact C3 to the wire 57 serve to afford the complete energizing circuit for the relay A. With this arrangement, the operation of the relay B or the relay C serves to break the energizing circuit for the relay A and prevent energization of the relay A while such secondary relay remains operated. When the relay B is thus operated, the shifting of the contact B3 into engagement with the contact B3U serves to extend circuit from the line wire L2 to the contact B3U and thence through wires 68 and 69 in series to one of the direction determining terminals of the electrically operated speed adjusting means 26, the common terminal of which is connected by a wire 70 to the line wire L1. Similarly, the other direction determining terminal of the adjusting means 26 is connected by wires 71 and 71A in series to the contact C3U, so that operation of the relay C completes a circuit which drives the adjusting means 26 in an opposite direction. The contacts B3U and C3U thus constitute the control contacts for the adjusting means 26 and such control may be direct as herein shown or may be attained through intermediate power relays as desired.

The relays B and C are so arranged that they may be energized only when the main relay A is in its operated condition, and for this purpose a wire 72 extends from the wire 56 to the contact A1, and a wire 73 is extended from the contact A1L and has branch leads 74 and 75 extended respectively to one terminal of the windings of the relays B and C. The other terminal of the winding of the relay B is conected by wires 76 and 77 in series to the contact B1, and a wire 78 is extended from the wire 76 to the contact C2L. A wire 79 extends from the contact C2 to the wire 46 so that when the relay A is in its operated condition, an impulse applied to the wire 46 will serve to operate the relay B. Upon such operation of the relay B, the energizing circuit is extended from the contact B1U by wires 80, 81 and 82 in series to the line wire L1, thereby to afford a locking circuit for the relay B until the main relay is released.

The circuits for the relay C are similar in character, and the other terminal of the relay C is connected by wires 85 and 86 in series to the contact C1U. A wire 87 extends from the wire 85 to the contact B2L, while a wire 88 extends from the contact B2 to the wire 47. The contact C1 is connected by wires 89 and 90 in series to the wire 81, and thus energizing and holding circuits for the relay C are provided which are similar to those afforded for the relay B. Since the period of closure of the energizing circuits of the relays B and C may be relatively short, condensers 92 and 93 of relatively small capacity are connected respectively across the terminals of the relays B and C so as to insure operation thereof even where the period of closure of the energizing circuits may be quite short.

As pointed out in the aforesaid copending application, the length of the release period of the main relay A constitutes a measure of the maximum time interval that should elapse, when the speed differential is within the specified limits, between an impulse transmitted along the wire 45 and an impulse transmitted along the wire 46 or the wire 47, and when such time interval is less than the release period of the main relay A, this condition is indicative of the existence of an objectionable speed difference between the shafts 20M and 20—1. Therefore the relay A preferably has its slow-to-release characteristics imparted thereto by a condenser 95 connected between the wire 62 and a wire 96 extended from the wire 60, thus to place the condenser 95 across the terminals of the relay A, and the effectiveness of the condenser 95 is adjustable by a rheostat 97 connected across the wire 62 and the wire 96.

The manner in which the relays of the control unit CU1 are energized is dependent on the relative positions of the secondary shaft and the master shaft as well as upon the sense and rate of any relative rotational movement which exists therebetween; and the selective operation of the relays A and B or relays A and C is indicative of the sense of relative rotation which exists between the master and secondary shaft, so that operation of the relays A and B serves to govern operation or adjustment of the speed control means in one direction while the selective actuation of the relays A and C serves to govern the operation or adjustment of the speed control means in the opposite direction. Of the two relays, B and C, the relay B is operated when the sense of relative rotation of the shafts indicates that the speed of the secondary shaft is to be reduced, while the relay C is operated when the sense of relative rotation indicates that the speed of the secondary shaft is to be increased; and therefore the contact B3U is connected to the terminal of the speed adjusting means which will operate the speed adjusting means in such a direction as to decrease the fuel supply to the engine 22. The circuit from the contact C3U to the other terminal of the speed adjusting means 26 serves to cause the speed adjusting means to increase the speed of the engine 22.

As an example of the operation of the structure thus far described it will be assumed that both the master shaft 20M and the secondary shaft 20—1 are rotating in a clockwise direction, as indicated by the arrows in Fig. 1, and that the speed of the secondary shaft 20—1 is slightly greater than that of the master shaft so that the sense of rotation of the secondary shaft is clockwise relative to the master shaft. For descriptive purposes, therefore, the master shaft may be considered as being stationary, with the brush 40 in the position shown, while the secondary shaft 20—1 and the connected brushes are rotating in a clockwise direction. Under such circumstances, the rotation of the brush assembly of the secondary commutator switch will establish a circuit from line wire L1 through the brush 40, the wire 51 and the commutator bars connected thereby, the brush 41, the wire 45, the relay A, the wire 62, wire 63, contacts B3L and B3, the wire 64, relay contacts C3L and C3, and wires 65, 66, and 57 back to the line wire L2. Thus the main relay A is energized and the contact A1 is engaged with contact A1L. Such energization of the main relay A continues until the aforesaid circuit is broken, as by the brush 41 passing in a clockwise direction past and out of contact with the commutator bar connected to the wire 51, and during this period of energization the condenser 95 is charged so as to maintain the relay A energized and the relay contacts A1—A1L closed for the desired delay or release period. Thus during such delay period, the continued closure of the contacts A1—A1L conditions the common circuit to the relays B and C so that these relays may be selectively energized by the cooperative action of the commutator switches MS and S1.

It may happen, of course, that the speed of relative rotation of the shafts 20M and 20—1 is so slow that the relay A will release or become ineffective and the relay contacts A1—A1L will be opened prior to the closure of a circuit to one of the secondary relays B or C. Such operation indicates that relative speed of the two shafts is within the allowable tolerance. However, if the speed of relative rotation of the two shafts exceeds such tolerance, and if it is of such a sense that the secondary shaft 20—1 is rotating in a clockwise direction relative to the master shaft 20M, the brush 42 of the secondary commutator will move into contact with the commutator bar which is connected to the wire 51 and the brush 40 prior to the expiration of the release period of the master relay A, and hence the circuit to the secondary relay B will be energized. This establishes a circuit through the contacts B3—B3U and the wires 68 and 69 so as to operate the speed governing means 26 to reduce the speed of the engine 22.

In accordance with the present invention, the amount or extent of the corrective adjustment is varied and controlled in various ways so as to attain unusual accuracy of correlation and unusual stability and the minimum fluctuation in the speed relationship of the two shafts. Thus, as one factor in attaining such controlled extent of the corrective adjustment, it will be clear that the length of the unexpired portion of the delay period of the main relay A at the time when the secondary relay coil, as B, is energized constitutes a variable quantity which is in a general way a measure of the amount of corrective adjustment which is needed to re-establish the desired speed relationship. It has been pointed out, however, in the preceding discussion that in attaining speed correlation within a relatively small tolerance, in the order of one revolution per minute, the mechanism must be able to detect extremely small speed differences, and this requires that the release period of the main relay A be quite extended in most instances. Thus, under many circumstances the extended release period would tend to so extend the operative period of the speed adjusting means 26 as to cause over-correction of the speed of the secondary shaft. In the aforesaid copending application means are provided which enable a release period of the desired length to be employed for the main relay A without danger of objectionable over-correction, and means of a similar character are utilized in the present apparatus for reducing the release time of the main relay A in each control operation of the speed adjusting means 26. Thus, a normally long release period in the order of three or four seconds may be employed for the main relay A, thereby to enable extremely small speed differences to be detected, and yet, this may be accomplished without causing an undue amount of corrective adjustment to be applied to the secondary shaft.

Thus, in the control unit CU1, the normal release time of the master relay A may be made relatively long, thereby to attain high sensitivity to small differences of speed, and means is provided for reducing this normal release time of the master relay A in the course of a control operation. In attaining this end, the wire 62 is extended to a terminal 100 from which branch leads 101 and 102 extend to corresponding ends of resistors 103 and 104 respectively. An adjustable contact 105, associated with the resistor 103, is connected to the contact B4, while an adjustable contact 106, associated with the resistor 104 is connected to the contact C4, and wires 107 and 108 extended respectively from the contacts C4U and B4U are connected to a wire 109 through which the resistances 103 or 104 may be connected across the terminals of the relay A as will now be described.

In the apparatus disclosed in the aforesaid copending application, the resistance corresponding to the resistances 103 and 104 was connected across the main relay, as A, immediately upon closure of the correcting circuit to the speed adjusting means, or in other words, upon operation of the relay B or the relay C, and because of this the release period of the main relay was reduced in the course of each correcting operation so as to require a succession of intermittent correcting operations where a large speed differential was encountered. Under the present invention, however, as embodied in the structure shown in Fig. 1, the action of the resistances 103 and 104 is modified or controlled so as to retain their effectiveness in preventing over-correction where small speed differences are detected while enabling relatively long periods of corrective adjustment to be attained when the detected speed differential is relatively large, and the net effect of this is to reduce the total time and the number of periods of corrective adjustment necessary to correct large speed differences.

The wire 109 is therefore extended to a stationary contact D1U of a relay D, the related movable contact D1 of which is normally engaged with the contact D1U and is connected to the wire 96. The relay D is of the slow-to-release type, and has a condenser 112 and an adjustable rheostat 113 connected in parallel across its terminals so as to enable an adjustable release period to be attained. One terminal of the relay D is connected by a wire 114 to the wire 90, thus to be connected to the line wire L1, while a wire 115 connects the other terminal of the relay D to the contact A1U. Thus, during those periods when the relay A is not energized or operated, the relay D will be energized and its contacts D1—D1U will be open. The release period for the relay D is so adjusted that it is substantially less than the release period of the main relay A, as for example, about one-half the release period of the relay A, and with this arrangement the controlling action of the apparatus is highly advantageous in that the long adjusting periods are attained when the speed differential is great, while short adjusting periods at small speed differentials are attained so as to avoid objectionable over-correction.

Thus where a large speed differential is detected so as to energize a secondary relay B or C early in the release period of the relay A, a substantial portion of the release period of relay D will remain, and the contacts D1—D1U will be maintained open until the end of the release period of the relay D. Hence the resistances 103 or 104 will be rendered ineffective until the end of the release period of the relay D, and therefore where a relatively large speed differential has been detected, a long adjusting period will be assured, despite the ultimate effectiveness of the resistances 103 or 104 in reducing the release period of the main relay A. This, of course, serves to reduce the number of adjusting operations required, and results in more rapid re-establishment of the desired speed relationship. It should be observed, however, that when the speed differential is sufficiently small to cause energization of the secondary relay, as B or C, after the release period of the relay D has expired, the resistance 103 or 104 becomes effective immediately upon operation of the secondary relay so as to reduce the release time of the main relay A in the manner described in the aforesaid copending application. Thus the apparatus shown in Fig. 1 is effective to re-establish the desired speed more rapidly, and yet objectionable over-correction is avoided.

Figure 2:
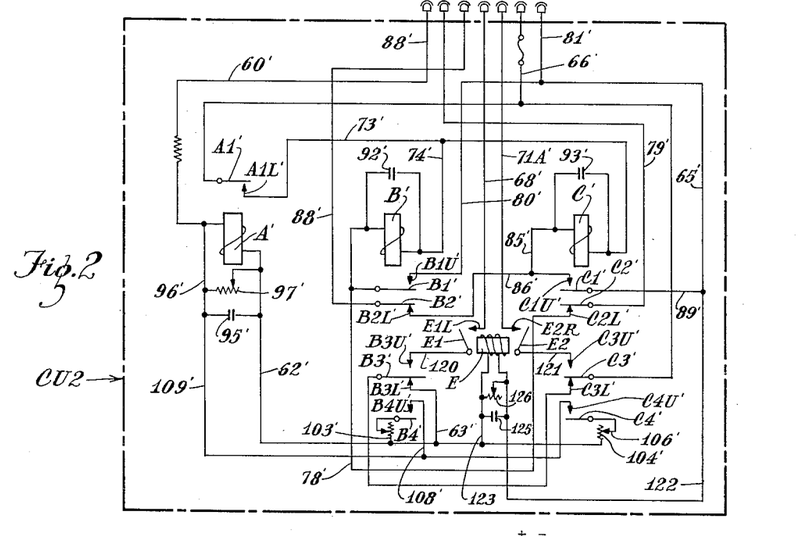
Fig. 2 is a wiring diagram illustrating another embodiment of control unit that may be utilized in the control apparatus of Fig. 1.

In the practical application of control apparatus of the kind to which the present invention relates, it may in some instances be desirable to limit the length of the speed adjusting periods to a predetermined maximum amount while enabling adjusting periods of proportionalized length to be attained as the speed differential is reduced, and in Fig. 2 of the drawings a relay unit CU2 is illustrated which may be substituted for the unit CU1 in Fig. 1 to attain such control. The relay unit CU2 is in most respects similar to the unit CU1, and corresponding reference characters are therefore employed with a single prime suffix added thereto, but it should be observed that in the unit CU2 the relay D has been eliminated so that the wire 109' is connected directly to the wire 96', and a limiting relay E has been added so as to break the energizing circuit to the speed adjusting means at the end of the desired maximum adjusting period.

As illustrated in Fig. 2, the relay E has movable contacts E1 and E2 that are spring urged toward their open positions, and when the relay E is energized the contacts E1 and E2 are engaged respectively with stationary contacts E1L and E2R. The contact E1L is connected to the power output lead 68', while the contact E1 is connected by a wire 120 to the contact B3U'. Similarly, the contact E2R is connected to the wire 71A', and the contact E2 is connected by a wire 121 to the contact C3U'. Thus, the adjusting means 26 may be energized only while the relay E is in its energized or operated condition, and the relay E is therefore arranged so as to embody slow-to-release characteristics which by the resulting release period will serve to limit the speed adjusting periods to a predetermined maximum value. Thus the relay E has one terminal connected by a wire 122 to the wire 65', while the other terminal is connected by a wire 123 to the wire 62', thus to an energizing circuit for the relay E, and a condenser 125 and an adjustable rheostat 126 are connected across the wires 122 and 123 to impart the desired slow-to-release characteristics to the relay E. The energizing circuit that is thus afforded for the relay E includes the relay contacts B3L' and C3L' so that the relay E is normally energized and has the energizing circuit broken whenever the relay B or the relay C is energized. Thus the release period of the relay E starts to run at the time when the speed adjusting operation of the means 26 is started, and unless sooner terminated by release of the relay A, the adjusting period will be terminated at the end of the release period of the limiting relay E. It will be evident, of course, that during the release or delay period of the relay E, the resistances 103' and 104' will be effective selectively to reduce the release period of the relay A, thereby to attain the proportionalized controlling action described in the aforesaid copending application, and yet the relay E will be effective to limit the maximum length of the adjusting periods.

In an instance where the speed adjusting rate of the speed adjusting means 26 is to be relatively great, and where the tolerance to which the speed relationship is to be adjusted is relatively small, it is desirable to afford relatively long control or adjusting periods when the detected speed differential is large and to limit the length of the adjusting periods to a relatively small maximum as the desired speed relationship is approached, for by such control operation the time required to make a large speed correction is minimized while danger of over-correction is avoided. For attaining such a wide range of operation the relay unit CU3 illustrated in Fig. 3 of the drawings may be substituted for the relay unit CU1.

Figure 3:
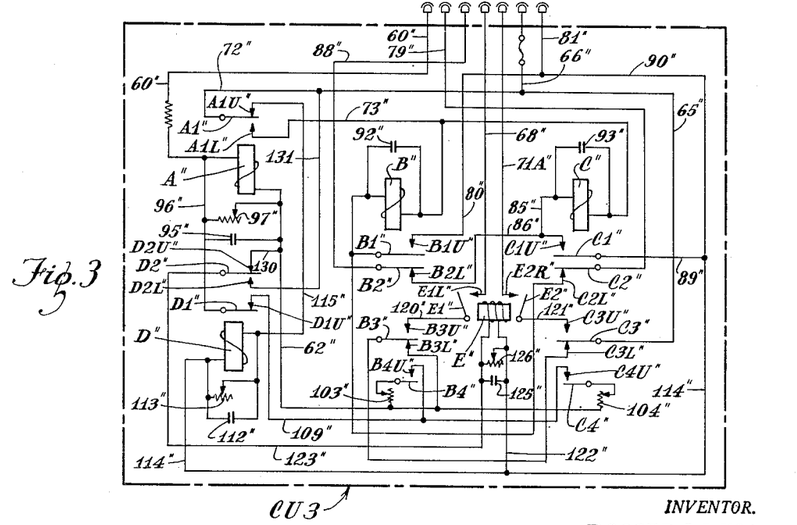
Fig. 3 is a wiring diagram illustrating still another control unit that may be utilized in the control apparatus of Fig. 1.

The relay unit CU3 is in most respects similar to the relay unit CU1, and similar reference characters are therefore employed with a double prime suffix in Fig. 3, but in this connection it may be observed in a broad sense that relays D'' and E'', similar to the relays D and E, are utilized and inter-related in the relay unit CU3 so that the relay E'' is dominated by the relay D'' and becomes effective to limit the control or adjusting periods only when the speed differential has been reduced to such a point that the relay D'' is ineffective. Thus the relay D'' has the contact D1U'' connected to the wire 109'' in the same manner as in the relay unit CU1, so as to thereby connect the resistance 103'' or 104'' across the main relay A'' at the expiration of the release period of the relay D''. In the relay unit CU3, however, the relay D'' has a second movable contact D2'' that is disposed between stationary contacts D2U'' and D2L'' so as to be engaged with the contact D2U'' when the relay D'' is released and with the contact D2L'' when the relay D'' is energized. The movable contact D2'' is connected by a wire 123'' to one terminal of the relay E'', the other terminal of which is connected by a wire 122'' to the wire 114''. The contact D2U'' is connected by a wire 130 to the wire 62'', while the contact D2L'' is connected by a wire 131 to the wire 72'', thus to relate the relay E'' and its operation to the operation of the relay D'' and the other elements of the unit, as will now be described.

Thus in the operation of the relay unit CU3, the relay D'' is energized through the contacts A1''—A1U'' so long as the relay A'' remains de-energized, and because of this, the relay E'' is also energized continuously through the relay contacts D2''—D2L''. When relative rotation of the shafts 20M and 20—1 causes the relay A'' to be energized, the relay contact A1'' breaks the energizing circuit for the relay D'' and conditions the circuit through the wire 73'' for the relays B'' and C''. This action serves, of course, to initiate the delay or release period of the relay D'', and if the existing speed differential is such as to cause the relay B'' or C'' to be energized during the release period of the relay D'', the speed adjusting operation of the adjusting means 26 will continue from the time when the relay B'' or C'' is energized through the remainder of the release period of the relay D'' and for a period thereafter that will be controlled by the limiting action of the relay E'' or by the action of the resistance 103'' or 104'' in reducing the release time of the relay A''.

It will be observed that the function of the relay E'' and the function of the resistances 103'' and 104'' are generally the same when considered broadly, in that both the relay E'' and the resistances 103'' and 104'' are intended to reduce or limit the length of the adjusting periods when the detected speed differential is small, but it is important to note that these elements in effect complement each other in a functional sense in accomplishing the ultimate objective of rapid correction without hunting. Moreover, through the use of relays D'' and E'' in association with the master relay A'' and the secondary relays B'' and C'', relationship of the release periods of the relays A'', D'' and E'' may be established to conform with the speed, tolerance, the operating rate of speed adjusting means, and other factors which influence the attainment of the desired speed correlation, and thus the present control apparatus is extremely adaptable in character.

The apparatus may thus be utilized where high speeds or speed differentials at high speeds are likely to be encountered, for under such circumstances the condensers 92'' and 93'' may be made of sufficiently large capacity to insure completion of operation of the relays B'' or C'' even when the period of circuit closure thereto is extremely short. In the absence of the relay E'', such capacity in the condensers 92'' and 93'' may be objectionable in some instances because such increased capacity has a tendency to impart limited slow-to-release characteristics to the relays B'' and C''. Such slow-to-release characteristics in the relays B'' and C'' may, under circumstances where short adjusting periods are desirable, tend to hold the relay B'' or C'' operated after release of the master relay A'', and such an objectionable action would of course be independent of the controlling or pulse reducing action of the resistors 103'' and 104''. Thus, through the use of the limiting relay E'', the effect of condensers as 92" and 93" associated with the respective relays B" and C" is rendered immaterial insofar as the attainment of short or limited adjusting periods may be concerned, and therefore, such condensers may be made of the capacity which produces optimum results insofar as detection is concerned.

The resistances 103" and 104" are however extremely important in the arrangement embodied in the relay unit CU3, for these resistances 103" and 104" serve to reduce the normal release period of the master relay A so as to thereby promptly condition the apparatus for sensing of the new or corrected speed relationship. As a result, the resistances 103" and 104" cooperate with the relay D" and the relay E" in minimizing the time required to attain correction of the speed relationship, the relay D" serving to disable the relay E" and the resistances 103" and 104" so as to produce long control pulses for correcting large detected speed differences, while the relay E" assures against over-correction and the resistances 103" and 104" enable sensitivity of detection to be attained while at the same time assuring prompt or rapid re-occurrence of adjusting periods as the desired speed relation is approached.

Thus, through the attainment of long adjusting periods when large speed differences are detected, together with an assured limitation of the adjusting periods as the desired speed relation is approached, as well as sensitivity of detection and minimum idle periods between periods of adjustment, the present invention produces greatly improved speed regulation. Actually, the time required, and the number of adjusting periods required to correct a particular speed difference have been found to be reduced by substantially fifty percent through the inclusion of relays D" and E" in the relay unit CU3.

The various embodiments of the present invention have been described herein with particular reference to the correlation of but a single secondary shaft with the speed of a master shaft, but it will be evident that under the principles and teachings set forth in the aforesaid copending application, the apparatus may be applied to the correlation of a plurality of secondary shafts with respect to the speed of a master shaft.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims:

I claim:

1. In a control apparatus, a master relay having slow-to-release characteristics affording a normal release period of substantially predetermined length, a secondary relay, a control circuit having switch means therein arranged for closure when said secondary relay is rendered operative during such a release period of said master relay, means affording a holding circuit for said secondary relay rendered effective by said secondary relay when said secondary relay is operated and governed by said master relay to release said secondary relay when said master relay releases, resistance means operable when rendered effective to reduce the release period of said master relay, a third relay having a slow-to-release period less than the release period of said master relay and governed by said master relay so as to be energized only when said master relay is released, and means rendered operative by said third relay when said third relay is released for rendering said resistance means operable to reduce the release period of said master relay.

2. In a control apparatus, a master relay having slow-to-release characteristics affording a normal release period of substantially predetermined length, resistance means operable when effective to reduce the release period of said master relay, a secondary relay, a control circuit having switch means therein arranged for closure when said secondary relay is rendered operative during such a release period of said master relay, means affording a holding circuit for said secondary relay rendered effective by said secondary relay when said secondary relay is operated and governed by said master relay to release said secondary relay when said master relay releases, a third relay having a slow-to-release period less than the release period of said master relay and governed by said master relay so as to be energized only when said master relay is released, means rendered operative by said third relay when said third relay is released for rendering said resistance means operable to reduce the release period of said master relay, and means governed by said third relay and operable a predetermined time after said third relay is released to break said control circuit.

3. In a control apparatus, a master relay, means including condenser connected across the coil of said master relay to impart slow-to-release characteristics affording a normal release period of substantially predetermined length, a secondary relay, a control circuit having switch means therein arranged for closure when said secondary relay is rendered operative during a release period of said master relay, means affording a holding circuit for said secondary relay rendered effective by said secondary relay when said secondary relay is operated and governed by said master relay to release said secondary relay when said master relay releases, a third relay having slow-to-release characteristics affording a normal release period that is substantially less than the release period of said master relay and having an energizing circuit that is governed by said master relay so as to be closed only when said master relay is released, a resistance, means including a normally open contact of said secondary relay and a normally closed contact of said third relay for connecting said resistance across the coil of said master relay in parallel with said condenser to thereby reduce the release time of said master relay, a fourth relay having a normally open contact included in said control circuit and having means affording a slow-to-release period that is extremely short, and an energizing circuit for said fourth relay including a normally closed contact of said third relay.

4. In a control apparatus, a master relay having slow-to-release characteristics affording a normal release period of substantially predetermined length, a pair of secondary relays, a first control circuit having switch means therein arranged for closure when a first one of said secondary relays is rendered operative during such a release period of said master relay, means affording a holding circuit for said one of said secondary relays rendered effective by said one of said secondary relays when said one of said secondary relays is operated and governed by said master relay to release said one of said secondary relays when said master relay releases, a second control circuit having switch means therein arranged for closure when the other one of said secondary relays is rendered operative during such a release period of said master relay, means affording a holding circuit for said other one of said secondary relays is operated and governed by said master relay to release said other one of said secondary relays when said master relay releases, means rendered operative selectively by said secondary relays when one of said secondary relays is operated for reducing the release period of said master relay, a third relay having normally open contacts included in the respective control circuits, having means associated therewith operable to afford a predetermined release period to said third relay, and an energizing circuit for said third relay governed at least in part by said master relay.

5. In an apparatus for association with means for effecting a control operation, electrical means for operating such a control operating effecting means, at least two relays, means for energizing said relays successively, at least one of said relays being a slow-to-release relay having a normal release period of substantially predetermined length, circuit means associating said relays and affording a control circuit to enable current to flow to said electrical means when at least one other of said relays is energized at a time when a slow-to-release relay remains operative, means conditioned by one of said relays as an incident to the closure of said control circuit for shortening the release period of the slow-to-release relay which is then operative, and means including another slow-to-release relay governed by said one of said relays and operable during a predetermined initial portion of the release period of the slow-to-release relay to prevent said last mentioned means from being effective during said predetermined initial portion of said release period and for thereafter rendering such last mentioned means effective.

6. In a control apparatus adapted for association with detecting means, a master relay and a secondary relay adapted to be energized alternately in response to such a detecting means, said master relay having slow-to-release characteristics affording a normal release period of substantially predetermined length, a control circuit having switch means therein arranged for closure when said secondary relay is rendered operative during such a release period of said master relay, means affording a holding circuit for said secondary relay rendered affective by said secondary relay when said secondary relay is operated and governed by said master relay to release said secondary relay when said master relay releases, resistance means operable when rendered effective to reduce the release period of said master relay, a third relay having a slow-to-release period less than the release period of said master relay and governed by said master relay so as to be energized only when said master relay is released, means rendered operative by said third relay when said third relay is released for rendering said resistance means operable to reduce the release period of said master relay, a slow-to-release limiting relay having a relatively short release period and having normally open contacts included in said control circuit, and an energizing circuit for said limiting relay governed jointly by said third relay and said secondary relay.

7. In a control apparatus, a master relay having slow-to-release characteristics affording a normal release period of substantially predetermined length, resistance means operable when effective to reduce the release period of said master relay, a secondary relay, a control circuit having switch means therein arranged for closure when said secondary relay is rendered operative during such a release period of said master relay, means affording a holding circuit for said secondary relay rendered effective by said secondary relay when said secondary relay is operated and governed by said master relay to release said secondary relay when said master relay releases, a third relay having a slow-to-release period less than the release period of said master relay and governed by said master relay so as to be energized only when said master relay is released, means rendered operative by said third relay when said third relay is released for rendering said resistance means operable to reduce the release period of said master relay, and means governed by said third relay and operable to break said control circuit a predetermined time after said third relay is released or a predetermined time after said secondary relay is operated depending upon which of these two events is the last to take place in an operating cycle.

8. In a control apparatus adapted for association with detecting means, a master relay and a secondary relay adapted to be energized alternately in response to such a detecting means, means including condenser connected across the coil of said master relay to impart slow-to-release characteristics affording a normal release period of substantially predetermined length, a control circuit having switch means therein arranged for closure when said secondary relay is rendered operative during a release period of said master relay, means affording a holding circuit for said secondary relay rendered effective by said secondary relay when said secondary relay is operated and governed by said master relay to release said secondary relay when said master relay releases, a third relay having slow-to-release characteristics affording a normal release period that is substantially less than the release period of said master relay and having an energizing circuit that is governed by said master relay so as to be closed only when said master relay is released, a resistance, means including a normally open contact of said secondary relay and a normally closed contact of said third relay for connecting said resistance across the coil of said master relay in parallel with said condenser to thereby reduce the release time of said master relay, a fourth relay having a normally open contact included in said control circuit and having means affording a slow-to-release period that is extremely short, and an initial energizing circuit for said fourth relay including a normally open contact of said third relay, and a final energizing circuit for said fourth relay including a normally closed contact of said third relay and a normally open contact of said secondary relay.

9. In a control apparatus adapted for association with detecting means, a master relay and a secondary relay adapted to be energized alternately in response to such a detecting means, said master relay having slow-to-release characteristics affording a normal release period of substantially predetermined length, a control circuit having switch means therein arranged for closure when said secondary relay is rendered operative during such a release period of said master relay, means affording a holding circuit for said secondary relay rendered effective by said secondary relay when said secondary relay is operated and governed by said master relay to release said secondary relay when said master relay releases, resistance means operable when rendered effective to reduce the release period of said master relay, a third relay having a slow-to-release period less than the release period of said master relay and governed by said master relay so as to be energized only when said master relay is released, means rendered operative by said third relay when said third relay is released for rendering said resistance means operable to reduce the release period of said master relay, a slow-to-release limiting relay having a relatively short release period and having normally open contacts included in said control circuit, and energizing circuit means for said limiting relay including an initial circuit that is closed by said third relay when said third relay is operated and opened when said third relay is released, and a final circuit that is closed when said third relay and said secondary relay are released and which is opened when said secondary relay is operated.

10. In a control apparatus, a master relay having slow-to-release characteristics affording a normal release period of substantially predetermined length, a secondary relay, a control circuit having switch means therein arranged for closure when said secondary relay is rendered operative during such a release period of said master relay, means affording a holding circuit for said secondary relay rendered effective by said secondary relay when said secondary relay is operated and governed by said master relay to release said secondary relay when said master relay releases, resistance means operable when effective to reduce the release period of said master relay, a third relay having a slow-to-release period less than the release period of said master relay and governed by said master relay so as to be energized only when said master relay is released, means conditioned for operation by said secondary relay when said secondary relay is operated and rendered operative by said third relay when said third relay is released for rendering said resistance means operable to reduce the release period of said master relay, and means governed by said third relay and operable to break said control circuit a predetermined time after said third relay is released or a predetermined time after said secondary relay is operated depending upon which of these two events is the last to take place in an operating cycle.

ROSSER L. WILSON.

REFERENCES CITED

The following references are of record in the file of this patent:

UNITED STATES PATENTS

| Number | Name | Date |
|---|---|---|
| 1,913,699 | Crago | June 13, 1933 |
| 2,232,753 | Wilson | Feb. 25, 1941 |
| 2,322,114 | Clare et al. | June 15, 1943 |
| 2,339,750 | Bartholy | Jan. 25, 1944 |
| 2,381,250 | Baumann | Aug. 7, 1945 |
| 2,408,451 | Sorenson | Oct. 1, 1946 |
| 2,423,614 | O'Callaghan | July 8, 1947 |
| 2,443,437 | Wilson | June 15, 1948 |
| 2,460,055 | Wilson et al. | Jan. 25, 1949 |

FOREIGN PATENTS

| Number | Country | Date |
|---|---|---|
| 528,132 | Great Britain | Oct. 23, 1940 |